United States Patent
Wheelock

(10) Patent No.: US 12,021,753 B2
(45) Date of Patent: Jun. 25, 2024

(54) PRESERVING QUALITY OF SERVICE (QoS) MARKINGS FOR DOWNSTREAM FLOWS

(71) Applicant: ARRIS Enterprises LLC, Suwanee, GA (US)

(72) Inventor: Ian G. Wheelock, Cork (IE)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/725,776

(22) Filed: Apr. 21, 2022

(65) Prior Publication Data
US 2022/0368640 A1 Nov. 17, 2022

Related U.S. Application Data

(60) Provisional application No. 63/188,637, filed on May 14, 2021.

(51) Int. Cl.
*H04L 47/24* (2022.01)
*H04L 47/43* (2022.01)

(52) U.S. Cl.
CPC .............. *H04L 47/24* (2013.01); *H04L 47/43* (2022.05); *H04L 2212/00* (2013.01)

(58) Field of Classification Search
CPC ..... H04L 47/24; H04L 47/43; H04L 2212/00; H04L 12/4633; H04L 47/2408; H04L 47/2483; H04W 28/02
See application file for complete search history.

(56) References Cited

U.S. PATENT DOCUMENTS

| | | |
|---|---|---|
| 7,050,396 B1 | 5/2006 | Cohen et al. |
| 2020/0053018 A1* | 2/2020 | White .................. H04L 47/11 |
| 2022/0021645 A1* | 1/2022 | Boutros ................ H04L 12/66 |
| 2022/0353352 A1* | 11/2022 | Wheelock ............ H04L 69/163 |
| 2023/0006966 A1* | 1/2023 | Li ........................ H04L 67/145 |

FOREIGN PATENT DOCUMENTS

EP   2 458 799   5/2012

OTHER PUBLICATIONS

International Search Report and the Written Opinion of the International Searching Authority dated Jun. 20, 2022 in International Application No. PCT/US2022/025697.
International Preliminary Report on Patentability dated Nov. 14, 2023 in corresponding International (PCT) Application No. PCT/US2022/025697.

\* cited by examiner

*Primary Examiner* — Khaled M Kassim
*Assistant Examiner* — Najeeb Ansari
(74) *Attorney, Agent, or Firm* — Wenderoth, Lind & Ponack, L.L.P.

(57) ABSTRACT

A network device receives an IPv4-in-IPv6 packet. An IPv6 header is removed. A first DSCP value in a TC field and a second DSCP value in a ToS field is stored in a database. The IPv4 packet is forwarded upstream and a return IPv4 packet is received. The returned IPv4 packet is encapsulated to form an IPv6 packet. The first DSCP value and the second DSCP value are retrieved from the database. Based on the at least one policy, the second DSCP value is inserted into an IPv4 ToS field and into an IPv6 TC field, the retrieved second DSCP value is inserted into the IPv4 ToS field and the first DSCP value is inserted into the IPv6 TC field, or the first DSCP value is inserted into the IPv6 TC field and into the IPv4 ToS field. The network device then forwards the IPv6 packet downstream.

17 Claims, 6 Drawing Sheets

PRESERVING QUALITY OF SERVICE (QoS) MARKINGS FOR DOWNSTREAM FLOWS

BACKGROUND

The subject matter of the present disclosure relates generally to preserving Quality of Service (QoS) markings for application in a downstream flow.

IPv6 dual-stack lite (DS-Lite) is a technology that enables Internet service providers to move to an IPv6 network while simultaneously handling IPv4 address depletion. Most systems that make up the public Internet are still enabled and support only IPv4, and many users' systems do not yet fully support IPv6. With DS-Lite, devices that access the Internet remain the same, thus allowing IPv4 users to continue accessing IPv4 internet content with minimum disruption to their home networks, while enabling IPv6 users to access IPv6 content. DS-Lite uses IPv4-in-IPv6 tunneling and IPv4 Network Address Translation (NAT) techniques to allow private IPv4 users to travel through IPv6 networks to access public IPv4 networks.

In the case of DSLITE operation within a DOCSIS network, the current DOCSIS specification spells out the ability to classify traffic using either an IPv6 header, or an IPv4 header. The DSLITE specification, however, does not address the case of IPv6 header with a tunneled IPv4 header. However, the Internet can destroy the original QoS value communicated in the IPv4 QoS/DSCP bits in an IPv4 Type of Service (ToS) field. The IPv4 ToS field is an 8-bit field that includes a 6-bit Differentiated Services Code Point (DSCP) field and a 2-bit Explicit Congestion Notification (ECN) field. The DSCP field may thus be used to identify 64 distinct DSCP values. Herein, ToS field, ToS field value/bits, DSCP field, and DSCP field value/bits may be used interchangeably to describe the mechanism for classifying and managing network traffic and providing quality of service (QoS).

Further, the value of the IPv4 ToS field may be copied into the IPv6 Traffic Class (TC) field thereby rendering the value of the IPv6 TC bits unreliable. Thus, the QoS markings in traffic arriving at the CMTS classification interface may be cleared (bleached) and such traffic will never be directed to the LLD DS service flows if the classification rules are matching TC bits. In other instances, badly marked traffic may end up on the LLD DS service flows, even though such traffic was never intended to be sent.

SUMMARY

An aspect of the present disclosure involves a system and method to preserve QoS markings for downstream flows in a network, based on previously received related upstream flows.

A network device that includes a memory storing computer-readable instructions and at least one policy for preserving Quality of Service (QoS) markings, and a processor configured to execute the computer-readable instructions to: receive, over an Internet Protocol version 4-in-Internet Protocol version 6 (IPv4-in-IPv6) tunnel of service provider network, a first IPv6 packet encapsulating a first IPv4 packet, remove a first IPv6 header from the first IPv6 packet to leave the first IPv4 packet and store an IPv6 record including a first Differentiated Services Code Point (DSCP) value in a Traffic Class (TC) field from the first IPv6 header in a database, obtain a first IPv4 header from the first IPv4 packet and store an IPv4 record including a second DSCP value in a Type of Service (ToS) field from the first IPv4 header in the database, and forward the first IPv4 packet to a destination IPv4 network.

A network device may be further configured to receive a responding IPv4 packet having a second IPv4 header, encapsulate the responding IPv4 packet with a second IPv6 header to form a second IPv6 packet encapsulating the responding IPv4 packet, retrieve the IPv6 record including the first DSCP value and the IPv4 record including the second DSCP value from the database, and based on the at least one policy, perform one of inserting the retrieved second DSCP value into an IPv4 ToS field in the second IPv4 header of the responding IPv4 packet and into an IPv6 TC field in the second IPv6 header, inserting the retrieved second DSCP value into the IPv4 ToS field in the second IPv4 header of the responding IPv4 packet and inserting the retrieved first DSCP value into the IPv6 TC field in the second IPv6 header, and inserting the retrieved first DSCP value into the IPv6 TC field in the second IPv6 header and into the IPv4 ToS field in the second IPv4 header of the responding IPv4 packet, The network device then forwards the second IPv6 packet encapsulating the responding IPv4 packet downstream.

A network device encapsulating a responding IPv4 packet with an IPv6 header to form a IPv6 packet, wherein the IPv6 packet is classified using the first DSCP value in the second IPv6 header.

A network device uses an IPv6 header that includes a Flow Label field value, store the Flow Label field value in the IPv6 record in the database, retrieve the Flow Label field value from the database, and insert the Flow Label field value into the second IPv6 header of the second IPv6 packet encapsulating the responding IPv4 packet, the Flow Label field value of the second IPv6 header used to classify the second IPv6 packet.

A network device stores the IPv6 record including the first DSCP value in the TC field in a Network Address Translation (NAT) database.

A network device stores the IPv4 record including the second DSCP value in the ToS field in a Network Address Translation (NAT) database.

A network device wherein the processor performs one of copying ECN bits from the IPv6 TC field to a corresponding position in the IPv4 ToS field of the first IPv4 packet received at an egress point of an upstream IPv6 tunnel before being forwarded to the destination IPv4 network and copying ECN bits from the IPv4 ToS field to a corresponding position in the IPv6 TC field of a second IPv6 packet before being forwarded to an ingress point of a downstream IPv6 tunnel.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to preserving Quality of Service (QoS) markings for downstream flows.

Figure 1:
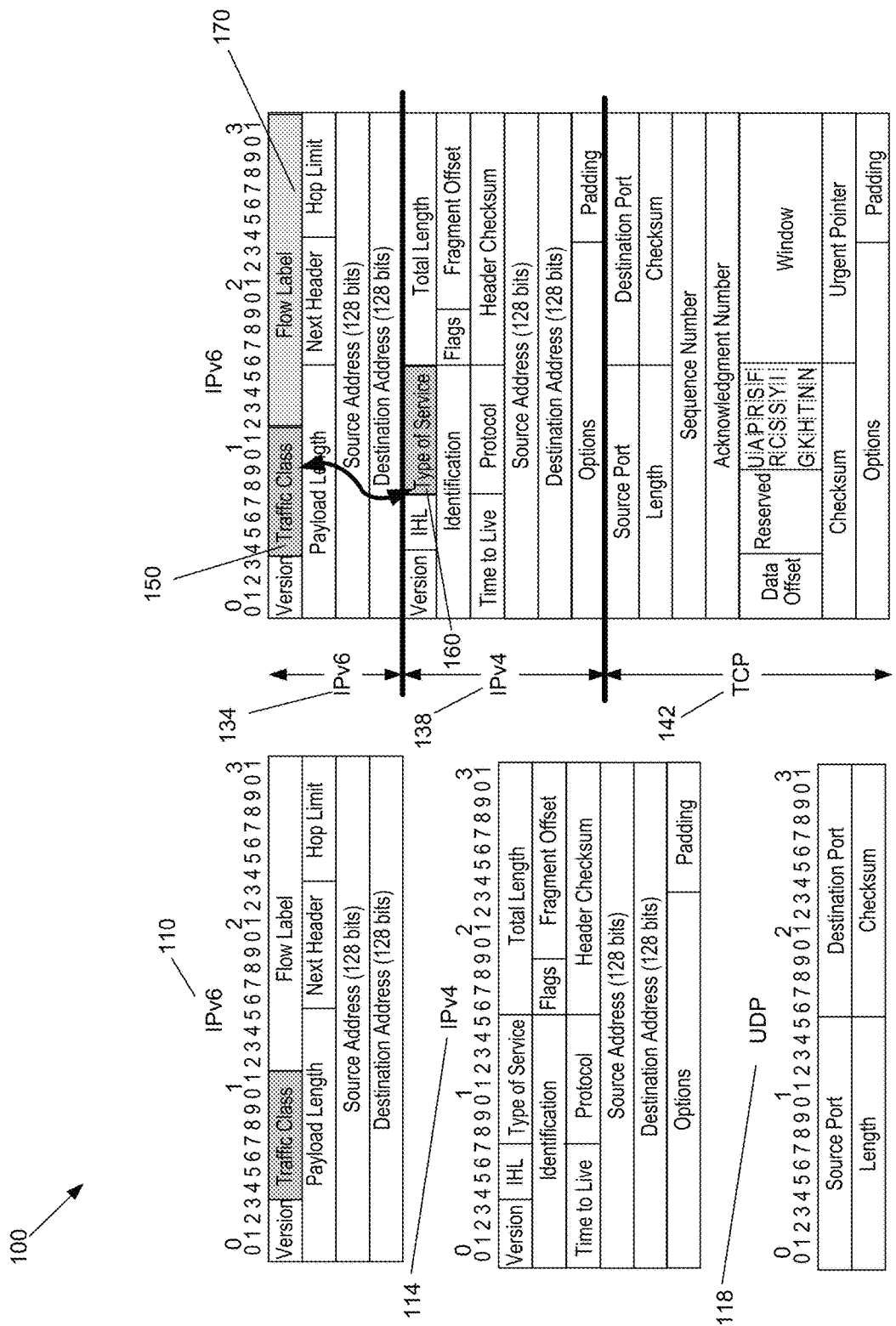
FIG. 1 illustrates various headers for providing information at the beginning of packets.

FIG. 1 illustrates various headers 100 for providing information at the beginning of packets.

FIG. 1 shows an Internet Protocol version 6 (IPv6) header 110, an Internet Protocol version 4 (IPv4) header 114, and a User Datagram Protocol (UDP) header 118. The UDP header 118 is a simple header for transport control. but does not include fields that are used for connection maintenance and does not provide reliable transport.

DS-Lite uses IPv4-in-IPv6 tunneling to send a subscriber's IPv4 packet through a tunnel on the IPv6 access network to the ISP. In FIG. 1, an IPv4 header 138 is placed after the IPv6 header 134. Because IPv4 addresses are becoming depleted, broadband service providers (DSL, cable, and mobile) need new addresses to supply new customers. Providing IPv6 addresses alone is often not workable because most of the systems that make up the public Internet are still enabled to support only IPv4, and many customer systems do not yet fully support IPv6. When a customer's device sends an IPv4 packet to an external destination, the IPv4 packet is encapsulated in an IPv6 packet for transport into the provider network. These IPv4-in-IPv6 tunnels are called softwires 214. Tunneling IPv4 over IPv6 is simpler than translation and eliminates performance and redundancy concerns. Such traffic undergoes NAT processing at the IPv4-in-IPv6 tunnel termination point before being delivered to the public Internet.

The IPv6 header 134 includes a Traffic Class (TC) field 150 and a Flow Label (FL) field 170. The IPv4 header 138 includes a Type of Service (ToS) field 160. the TC field 150 in the IPv6 header 134 is an 8 bit field, where 6 bits are used for the Differentiated Services Field Codepoints (DSCP) that is used to classify packets and 2 bits are used for Explicit Congestion Notification (ECN). The ToS field 160 in the IPv4 header 138 is an 8-bit field, where 6 bits are used for DSCP bits and 2 bits are for ECN. A flow is a stream of traffic that is coming from one source and destined for one or more destinations. A flow may contain multiple packets which can each be treated exactly the same way by intermediate routing devices. The FL field 170 can be used to identify these flows and enables these intermediate routing devices to treat all of the packets within the flow the same. This reduces processing time and consequently delay. The DSCP value of ToS field 160 in an IPv4 header 138 is copied into the TC field 150 of the corresponding IPv6 header 134 during the encapsulation process. A TCP header 142 or a UDP header 118 may follow the IPv4 header 138.

Both UDP and TCP run on top of IP and are sometimes referred to as UDP/IP or TCP/IP; however, there are important differences between the two. TCP sends individual packets and is considered a reliable transport medium. On the other hand, UDP sends messages, called datagrams, and is considered a best-effort mode of communications, which means the service does not provide any guarantees that the data will be delivered or offer special features to retransmit lost or corrupted messages. The UDP header 118 and TCP header 142 both provide port numbers to help distinguish different user requests and, a checksum capability to verify that the data arrived intact (optional for UDP).

Figure 2:
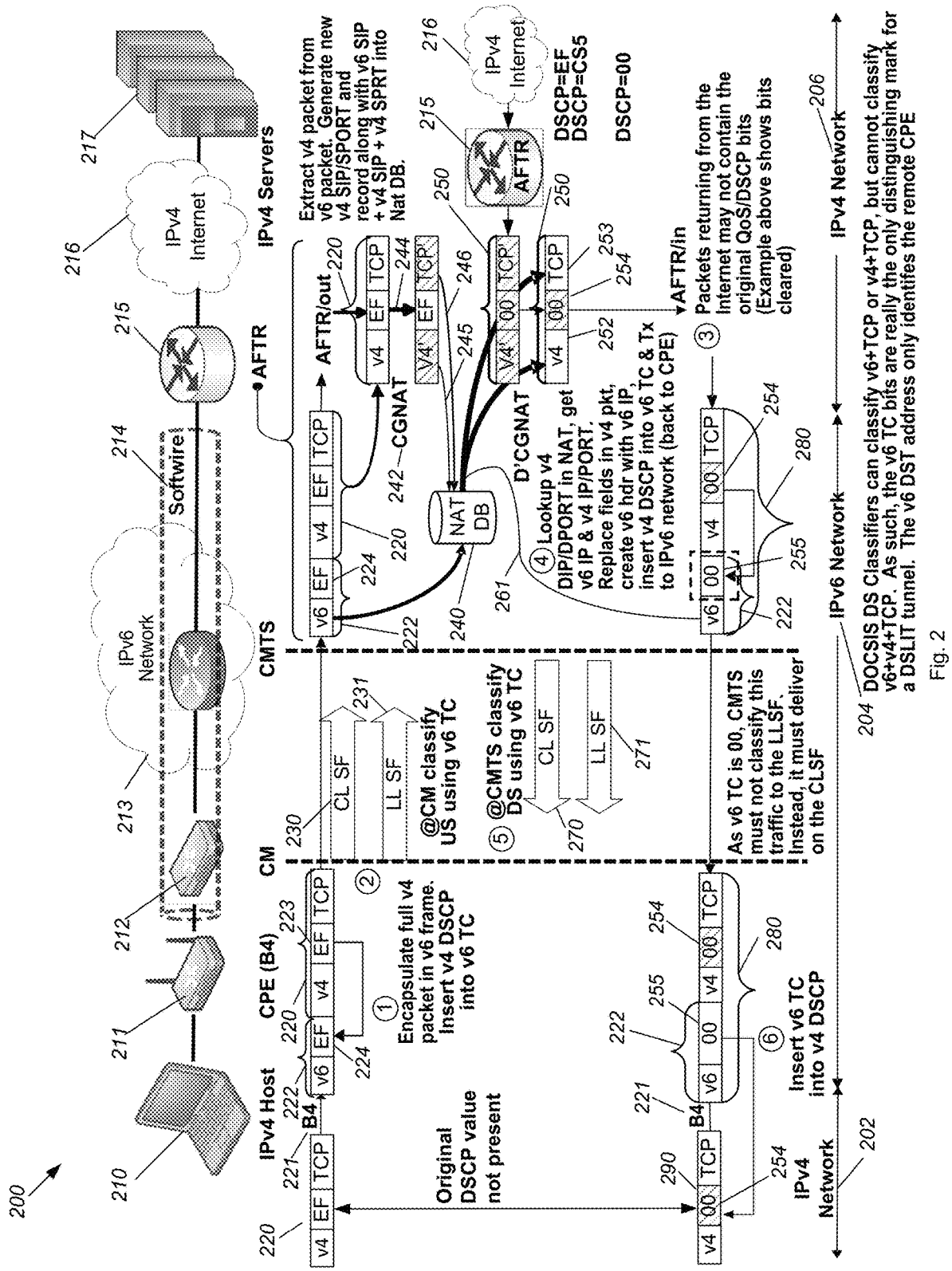
FIG. 2 illustrates normal AFTR processing in a network.

FIG. 2 illustrates normal AFTR processing in a network 300.

In FIG. 2, the AFTR element 215 does not process QoS/DSCP/TC bits in the IPv4/IPv6 header. An IPv4 host 210 in the IPv4 network 202 creates an IPv4 packet 220. The IPv4 packet includes an IPv4 header, the ToS field, and a TCP header or a UDP header. Hereinafter, only a TCP header will be mentioned to provide clarity. The ToS field is shown having a value of EF, which is for expedited-forwarding and given a high priority. As mentioned above, DSLITE allows IPv4 network traffic to be transmitted over an IPv6 network 204 of the provider using a point-to-point tunnel, before being delivered to the external IPv4 network 206, e.g., the Internet 216. The system relies on two key control functions, the Basic Bridging BroadBand (B4) element 221 and the Address Family Transition Router (AFTR) element 215. The B4 element 211 resides in Customer Premise Equipment (CPE) Gateways 211 and the B4 process 221 starts when the IPv4 packet 220 is received by the B4 element 211. The B4 element 211 establishes an IPv4-in-IPv6 tunnel 214 to connect to an AFTR 215. The IPv4-in-IPv6 tunnel 214 created between B4 311 and AFTR 215 is called a softwire. An IPv6 header 222 is added on IPv4 traffic 220 before passing over the IPv4-in-IPv6 tunnel 214. The B4 element 211 inserts a copy of the IPv4 DSCP in the ToS field 223 into the IPv6 TC field 224.

The Cable Modem (CM) 212 and the Cable Modem Termination System (CMTS) 213 are IPv6 enabled. The CM 212 receives the IPv6 packet and forwards it to the CMTS 213. The CM 212 classifies upstream (US) flows 230, 231 using the value set in the IPv6 TC field. While the embodiments herein are described with reference to a DOCSIS architecture, which includes a cable modem (CM), and a Cable Modem Termination System (CMTS), such an architecture is not required. The benefits provided by the processes described herein may be implemented using alternative networks, such as optical fiber networks (e.g., fiber-to-the-home, etc.), Multimedia over Coax Alliance (MoCA), and others.

The AFTR element 215 removes IPv4-in-IPv6 tunnel information from packets, e.g., the IPv6 header 222 for traffic directed to the Internet. A database, such as a Network Address Translation (NAT) database 240, is used to translate between private IPv4 addresses within the customer network and one or a few public addresses assigned by the provider and to store header information. A Carrier Grade NAT (CGNAT) 242 may also be provided within the service provider network. CGNAT 242 is the processing applied by the AFTR element 215 to provide NAT processing. GCNAT 242 owns the NAT database 240, and CGNAT 442 does the necessary packet transformation, e.g., SRCIP/SPORT modification, etc. A CGNAT also translates between private and public IPv4 addresses, and may be used to store header information.

The AFTR element 215 translates the source private IPv4 address in each decapsulated user packet to a public address and sends the packet to a destination IPv4 host. By the time packets reach the AFTR element 215, the IPv6 provider network may modify the QoS/DSCP values in the TC bits (if required by network admin policy), or they may remain untouched. The AFTR element 215 then performs Carrier Grade NAT (CGNAT) 224 on the traffic, transforming the received IPv4 packet 220 by generating a new IPv4 source IP address (SIP) 245/source port number (SPORT) 246 which is then stored in the CGNAT database 240. The AFTR element 215 then transmits the IPv4 packet 220 to the IPv4 internet 216. The IPv4 packet may be destined to IPv4 Servers 217.

IPv4 packets 250 are returned from the Internet 216 and processed by the AFTR element 215. Packets 250 returned from the Internet 216 may not contain the original QoS/DSCP bits, i.e., the bits in the IPv4 ToS field 244, as a result of bleaching. The IPv4 header information 252 and the TCP header information 253 are obtained from the database, e.g., NAT database 240. However, the IPv4 ToS bits 254 have been cleared to 0. The NAT database 240 is also used to translate the destination public IPv4 address 252 in a reply packet 250 sent by the destination IPv4 network 206 to a private IPv4 network 202. The AFTR element 215 obtains the IPv6 header 222 and the IPv4 DSCP 254 is copied to the IPv6 TC field 255 in the IPv6 header 222. The AFTR element 215 then sends the packet over the IPv4-in-IPv6 tunnel 214 to the IPv4 host 210.

On the way to the IPv4 host 210, DOCSIS DS Classifiers at the CMTS 213 classify v6+TCP or v4+TCP, but cannot classify v6+v4+TCP. As such, the IPv6 TC bits are really the only distinguishing mark for a IPv4-in-IPv6 tunnel 214. The IPv6 destination address only identifies the remote CPE B4 211.

At the CMTS 213, IPv6 TC 255 is 00, so the CMTS must not classify this traffic to the Low Latency (LL) service flow (SF) 271. Instead, the CMTS 213 must deliver the traffic on the Classic Latency (CL) SF 270. The IPv4-in-IPv6 packet 280 is processed by the B4 element 211 to remove the IPv6 header 222 and inserts the value in the IPv6 TC field 255 into the IPv4 ToS field 254 resulting in the IPv4 packet 290.

Figure 3:
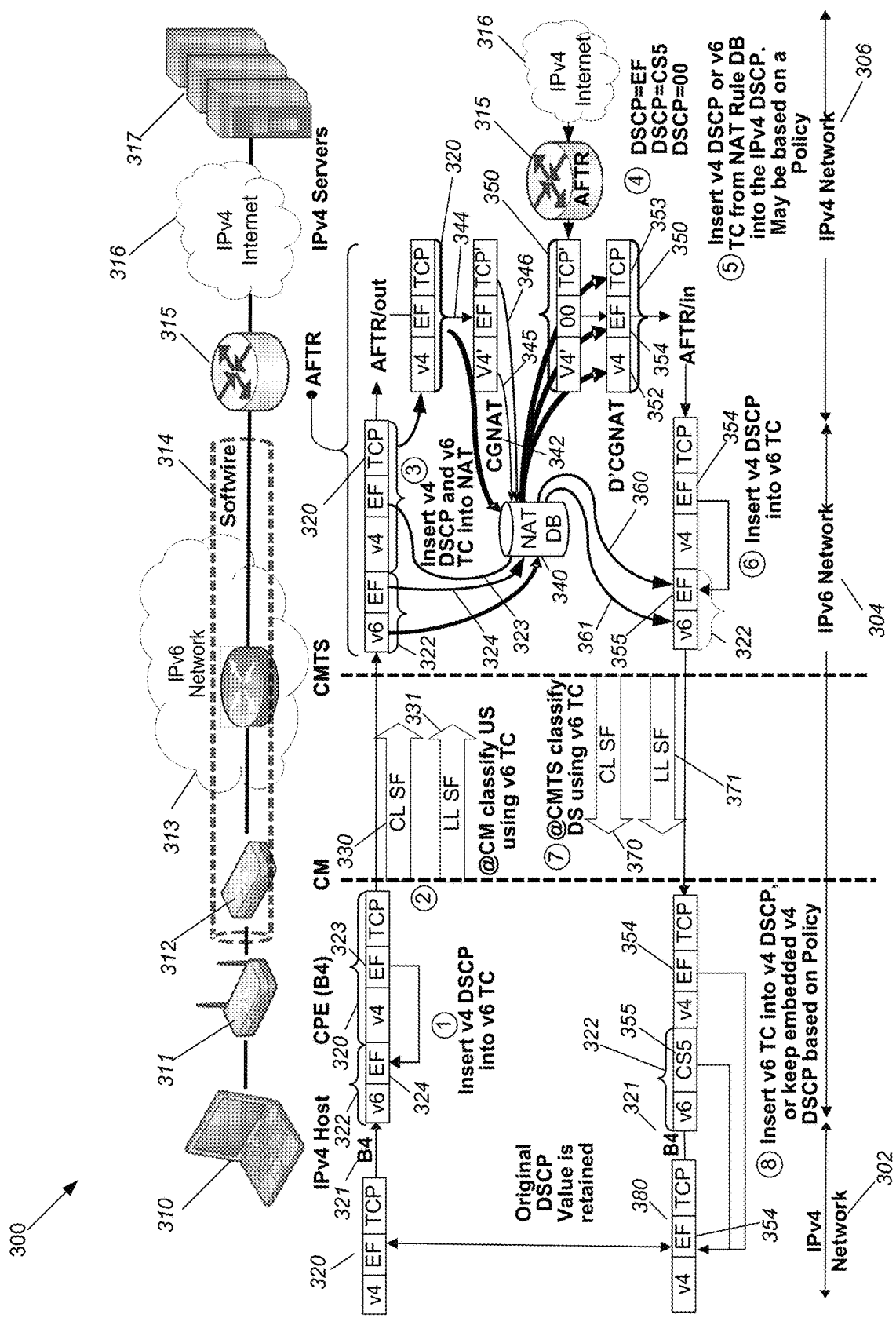
FIG. 3 illustrates modified AFTR processing in a network.

FIG. 3 illustrates modified AFTR processing 300 in a network 300.

In FIG. 3, the AFTR records IPv4 DSCP and IPv6 TC bit values of outbound network traffic, preserves these values in the CGNAT DB, and can reapply these values into inbound network traffic. The IP v4 DSCP 323 and the IPv6 TC 314 are recorded, for example, in a NAT rule in the NAT database 340. The IP v4 DSCP 323 and the IPv6 TC 314 are reapplied when processing a reply packet. A policy may be used to determine whether to insert the IPv6 TC field value 355 into the IPv4 ToS field 354 or to keep the value embedded in the IPv4 ToS field 354.

An IPv4 host 310 in the IPv4 network 302 creates an IPv4 packet 320. The IPv4 packet includes an IPv4 header with the ToS field, and a TCP header. Here the ToS field is shown having a value of EF, which is for expedited-forwarding and given a high priority. The B4 element 311 resides in Customer Premise Equipment (CPE) Gateways 311 and the B4 process 321 starts when the IPv4 packet 320 is received by the B4 element 311. The B4 element 311 establishes an IPv4-in-IPv6 tunnel 314 to connect to an AFTR 315. As noted above, the IPv4-in-IPv6 tunnel 314 created between B4 311 and AFTR 315 is called a softwire. An IPv6 header 322 is added on IPv4 traffic 320 before passing over the IPv4-in-IPv6 tunnel 314. The B4 element 311 inserts a copy of the IPv4 DSCP in the ToS field 323 into the IPv6 TC field 324. The CM 312 receives the IPv6 packet and forwards it to the CMTS 313. The CM 412 classifies upstream (US) flows 330, 331 using the value set in the IPv6 TC field 324.

The AFTR element 315 removes IPv4-in-IPv6 tunnel information from packets, e.g., the IPv6 header 322 to extract the IPv4 packet 320. CGNAT 342 is the processing applied by the AFTR element 315 to provide NAT processing. GCNAT 342 owns the NAT database 340, and CGNAT 342 does the necessary packet transformation, e.g., SRCIP/SPORT modification, etc. CGNAT 342 is also modified to record the IPv6 TC bits and the IPv4 DSCP bits.

By the time packets reach the AFTR element 315, IPv6 provider network may modify the QoS/DSCP bits (e.g., if required by network admin policy), or they may remain untouched. The AFTR element 315 stores the IPv6 header 322 including the value of the IPv6 TC field 324 in a database, such as the NAT database 340. The AFTR element 315 also stores the IPv4/TCP header information 320 including the IPv4 DSCP value in the ToS field 323 in the database, e.g., NAT database 340. The AFTR element 315 then transmits the IPv4 packet 320 to the IPv4 internet 316 and IPv4 servers 317.

IPv4 packets 350 are returned from the Internet 316 and processed by the AFTR element 315. Packets 350 returned from the Internet 316 may not contain the original QoS/DSCP bits, i.e., the bits in the IPv4 ToS field 344. In FIG. 3, the IPv4 ToS bits 354 have been cleared. Thus, the IPv4 header information 352 and the TCP header information 353 are obtained from the database, e.g., NAT database 340. However, the IPv4 ToS bits in packet 350 have been cleared. The IPv4 DSCP value in the ToS field 323 is obtained from the NAT database 340. The AFTR element 315 also obtains the IPv6 TC value 360 and the IPv6 header 361 from the NAT database 340. The value in the IPv4 DSCP ToS field 354 or the value in the IPv6 TC field 355 may be inserted into the IPv4 DSCP ToS field 354 in the reply packet 450. This may be based on a policy. The reply packet 350 is sent by the destination IPv4 network 306 to a private IPv4 network 302. The value in the IPv4 DSCP ToS field 354 may be inserted into the IPv6 TC field 355, or the IPv6 TC value 360 obtained from the NAT 340 may be inserted into the IPv6 TC field 355. The AFTR element 315 then sends the packet over the IPv4-in-IPv6 tunnel 314 to the IPv4 host 310.

On the way to the IPv4 host 310, classifiers at the CMTS 313 classify v6+TCP or v4+TCP, but cannot classify v6+v4+TCP. As such, the IPv6 TC bits are really the only distinguishing mark for a IPv4-in-IPv6 tunnel 314. The IPv6 destination address identifies the remote CPE B4 311. At the CMTS 313, the value of the IPv6 TC field 355 is EF, so the CMTS classifies the traffic to the Low Latency (LL) service flow (SF) 371. The IPv4-in-IPv6 packet 380 is processed by the B4 element 311 to remove the IPv6 header 322.

A policy may be used to determine whether to insert the value in the IPv6 TC field 355 into the IPv4 ToS field 354 in the IPv4 packet 380, or to direct the B4 element 311 to keep the embedded IPv4 DSCP value in the ToS field 354. Policies provide network operators flexibility where sometimes the network operator may want to preserve the values that come through, and at other times may not care what those values are because they are going to overwrite them anyway For example, if the value is not 00, but is also not EF, preservation of the value may be desired. Alternatively, the policy may dictate that whatever value comes through will be overwritten. Thus, the policy provides flexibility to the decision process. Policies may be implemented as part of a configuration applied to AFTR and/or B4. These are just examples of a policy that may be applied. Other rules could be used as part of policies applied during configuration of the AFTR and/or B4.

Figure 4:
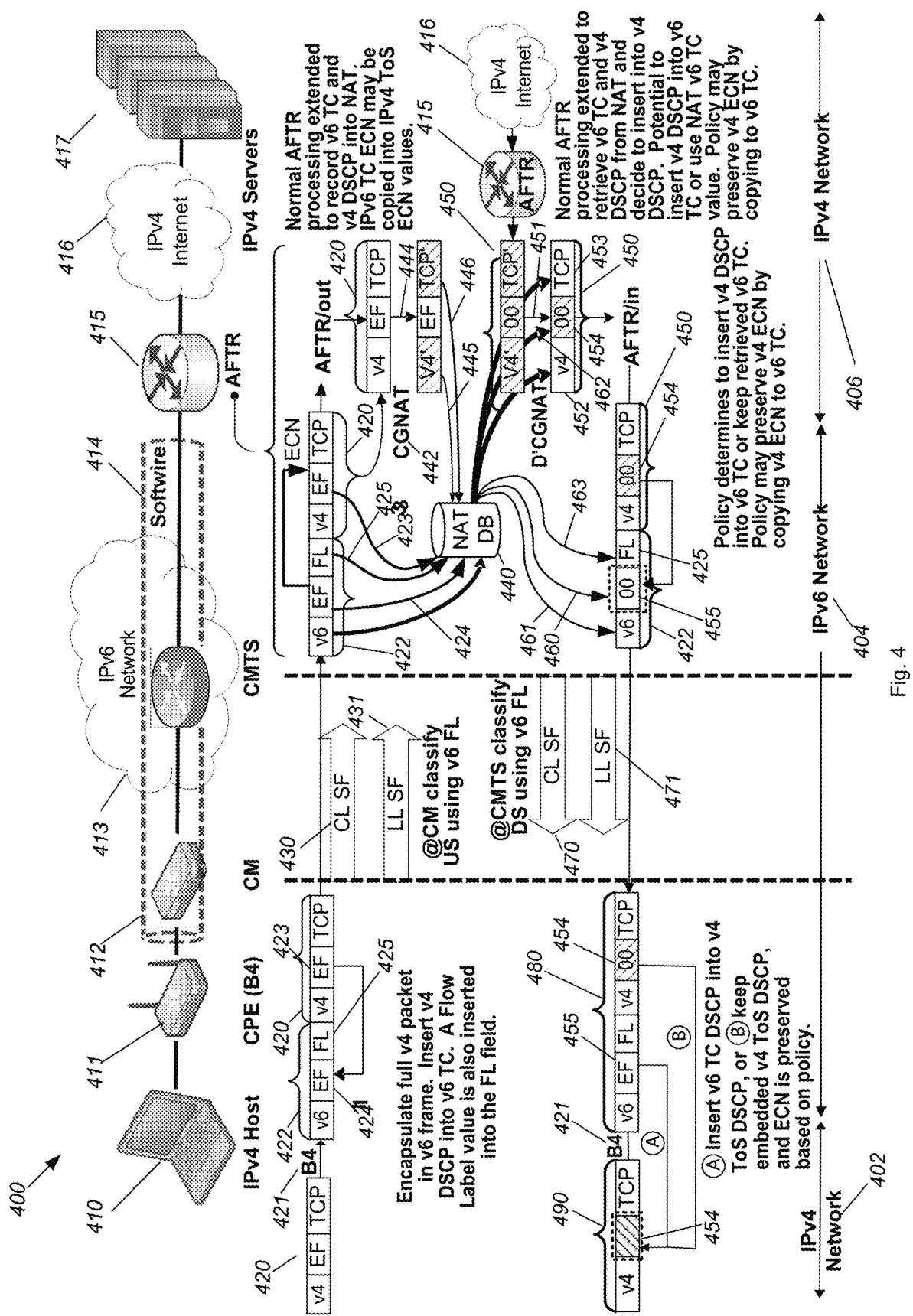
FIG. 4 illustrates the use of a Flow Label in the IPv6 header to simplify classification by the network.

FIG. 4 illustrates the use of a Flow Label in the IPv6 header to simplify classification by the network 400.

In FIG. 4, an IPv4 host 410 in the IPv4 network 402 creates an IPv4 packet 420. The IPv4 packet includes an IPv4 header with the ToS field 423, and a TCP header. Here the ToS field 423 is shown having a value of EF, which is for expedited-forwarding, which aligns with an US Low Latency classifier so the packet is given a high priority. The B4 element 411 resides in Customer Premise Equipment (CPE) Gateways 411 and the B4 process 421 starts when the IPv4 packet 420 is received by the B4 element 411. The B4 element 411 establishes an IPv4-in-IPv6 tunnel 414 to connect to an AFTR 415. An IPv6 header 422 is added on IPv4 traffic 420 before passing over the IPv4-in-IPv6 tunnel 414. The B4 element 411 inserts a copy of the IPv4 DSCP value in the ToS field 423 to the IPv6 TC field 424. The B4 element 411 also inserts a Flow Label field value 425 into the IPv6 header 422. The FL field 425 enables classification of packets belonging to a specific flow and is applied to select traffic to ensure it can be delivered to a Low Latency Service Flow as a result of matching an US traffic classifier in the CM and a DS traffic classifier in the CMTS. A flow is a sequence of related packets sent from a source to a destination. The CM 412 receives the IPv6 packet, classifies the flow based on the FL field 425, and forwards it to the CMTS 413.

The CMTS 413 forwards the IPv6 packet to the AFTR element 415, which removes IPv4-in-IPv6 tunnel information from the IPv6 packet, e.g., the IPv6 header 422, to extract the IPv4 packet 420. A database, such as a NAT database 440, may be is used to translate between private IPv4 addresses within the customer network and one or a few public addresses assigned by the provider, and to store records such as IPv6 or IPv4 record as discussed below. A CGNAT 442 may also be provided within the service provider network to store records.

When using the Flow Label, it is optional to include any of the DSCP/TC bit processing. The system can operate on the basis of recording any of the IPv4 DSCP value in the ToS field 423, the value of the IPv6 TC field 424, and the value of the IPv6 FL field 425 in a database, such as the NAT database 440. For example, the system may record the IPv4 DSCP value in the ToS field 423 and re-instate them, record the value of the IPv6 TC field 424 and re-instate them, record the IPv4 DSCP value in the ToS field 423 and the value of the IPv6 TC field 424 and reinstate them, or simply record the value of the IPv6 FL field 425 and re-instate them. Any and all combinations of the above can be supported, along with policies about copying TC< >DSCP bits in the B4 before sending into the home network. The AFTR element 415 then transmits the IPv4 packet 420 to the IPv4 internet 416 and IPv4 servers 417.

IPv4 packets 450 are returned from the Internet 416 and processed by the AFTR element 415. Packets 450 returned from the Internet 416 may not contain the original QoS/ DSCP bits, i.e., the bits in the IPv4 ToS field 444. In FIG. 4, the IPv4 ToS bits 454 have been cleared. Thus, the AFTR element 415 may retrieve any of any of the IPv4 DSCP value in the ToS field 423, the value of the IPv6 TC field 424, and the value of the IPv6 FL field 425, as discussed above. The IPv4 DSCP value 462 may be inserted into the IPv6 TC field 455, or the IPv6 TC value 460 may be obtained from the NAT 440 may be inserted into the IPv6 TC field 455. The FL value 463 may be inserted into the FL field 425. The AFTR element 415 then sends the packet over the IPv4-in-IPv6 tunnel 414 to the IPv4 host 410.

As shown in FIG. 4, classifiers at the CMTS 413 may use the IPv6 header 422 to classify packets. For example, classifiers at the CMTS 413 may use the value in the IPv6 FL field 425 pr the value of the IPv6 TC field 424. The IPv4-in-IPv6 packet 480 is processed by the B4 element 411 to remove the IPv6 header 422. A policy is used to determine whether to "A" insert the DSCP value in the IPv6 TC field 455 into the IPv4 ToS field 454 in the IPv4 packet 490, or to "B" direct the B4 element 411 to keep the embedded IPv4 DSCP value in the ToS field 454.

A Policy may be configured to provide the option of the AFTR 414 not copying value of the DSCP bits in the IPv4 ToS field 454 into the DSCP bits in the IPv6 TC field 455 before sending the IPv6 packet to the CMTS 413. As discussed with reference to FIG. 1, the ToS field 454 in the IPv4 header 450 is 8 bits, where 6 bits are used for the DSCP bits and 2 bits are used for Explicit Congestion Notification (ECN). Similarly, the TC field 455 in the IPv6 header 422 is 8 bits, where 6 bits are used for the DSCP bits that are used to classify packets and 2 bits are used for ECN.

As traffic is sent DS, the policy may call for the AFTR 414 to not copy the IPv4 DSCP bits in the IPv4 ToS field 454 into v6 TC, but rather the AFTR 414 retrieves the DSCP bits of the IPv6 TC 424 and the DSCP bits of the IPv4 ToS 423 from the NAT database 440 and installs them in the IPv6 TC field 455 and IPv4 ToS field 454, respectively. However, it may be important to copy the 2 ECN bits in the IPv4 ToS field 454 in the reply packet 450 to the corresponding position in the IPv6 TC field 455 in the IPv6 header 422. The 2 ECN bits in the IPv4 ToS field 454 may have been set to communicate congestion somewhere from the source to the destination in the Internet path, i.e., the IPv4 Network 406. A node that experiences congestion sets the 2 ECN bits to communicate such congestion.

However, the IPv6 TC field 455 in the IPv6 header 422 is the only data exposed to both the CM 412 and the CMTS 413. A lack of continuity between tunneled and non-tunneled traffic (relative to ECN bits) can lead to the loss of the important ECN information. Thus, if the 2 ECN bits in the IPv4 ToS field 454 are not copied to the corresponding position in the IPv6 TC field 455, the rest of the network downstream from the AFTR 415 will think that no congestion has been experienced in this packet flow and will treat the it as a good performing packet flow.

In the upstream direction, congestion may occur as the packet leaves the IPv4 host 410, the CPE (B4), CM 412, and CMTS 413 before arriving at the AFTR 415. However, only the ECN bits in the IPv6 TC field 424 are set by nodes in this path. To preserve any congestion settings occurring in the upstream, a policy may have the AFTR 415 copy the 2 ECN bits in the IPv6 TC field 424 to the corresponding position in the IPv4 ToS field 423. Thus, congestion settings applied to the ECN bits in the IPv6 TC field 424 are not lost when the IPv6 header 422 is removed to de-encapsulate the IPv4 packet 420.

Figure 5:
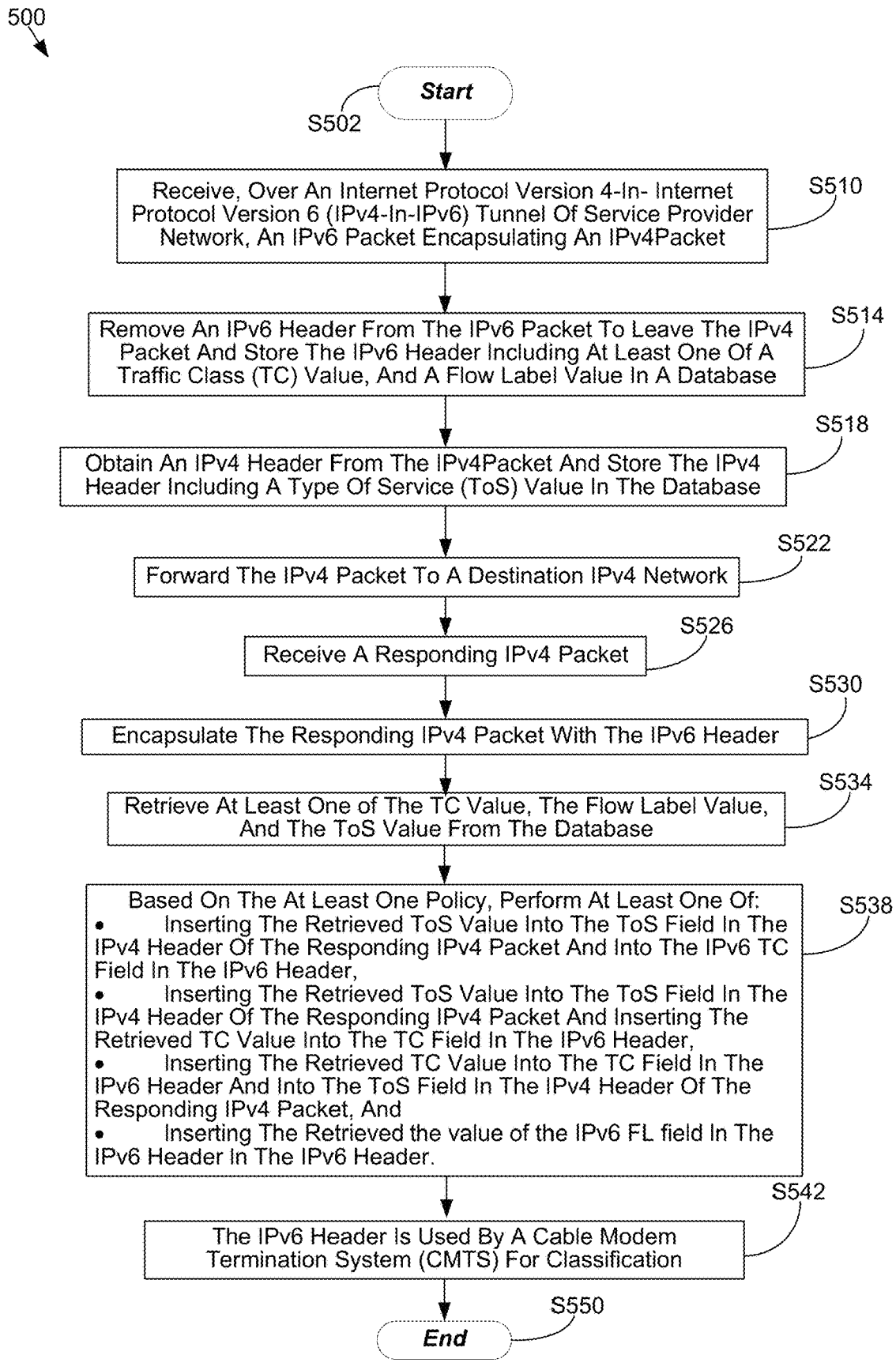
FIG. 5 is a flow chart of a method for preserving Quality of Service (QoS) markings for application in a downstream flow.

FIG. 5 is a flow chart of a method 400 for preserving Quality of Service (QoS) markings for application in a downstream flow.

In FIG. 5, method 500 starts (S502), and a first IPv6 packet encapsulating a first IPv4 packet is received over an Internet Protocol version 4-in-Internet Protocol version 4 (IPv4-in-IPv6) tunnel (S510). For example, referring to FIG. 4, an IPv4 host 410 in the IPv4 network 402 creates an IPv4 packet 420. The IPv4 packet includes an IPv4 header with the ToS field 423, and a TCP header. Here the ToS field 423 is shown having a value of EF, which is for expedited-forwarding so the packet is given a high priority. The B4 element 411 resides in Customer Premise Equipment (CPE) Gateways 411 and the B4 process 421 starts when the IPv4 packet 420 is received by the B4 element 411. The B4 element 411 establishes an IPv4-in-IPv6 tunnel 414 to connect to an AFTR 415. An IPv6 header 422 is added on IPv4 traffic 420 before passing over the IPv4-in-IPv6 tunnel 414. The B4 element 411 inserts a copy of the IPv4 DSCP value in the ToS field 423 to the IPv6 TC field 424. The CM 412 receives the IPv6 packet, classifies the flow based on the FL field 425, and forwards it to the CMTS 413.

A first IPv6 header is removed from the first IPv6 packet to leave the first IPv4 packet. and an IPv6 record including a Traffic Class (TC) field value from the first IPv6 header is stored in a database (S514). Referring to FIG. 4, the CMTS 413 forwards the IPv6 packet to the AFTR element 415, which removes IPv4-in-IPv6 tunnel information from the IPv6 packet, e.g., the IPv6 header 422, to extract the IPv4 packet 420. The AFTR element 415 stores an IPv6 record including the value of the IPv6 TC field 424 and the value of the IPv6 FL field 425 in a database, such as the NAT database 440.

A first IPv4 header is obtained from the first IPv4 packet, and an IPv4 record including a Type of Service (ToS) field value from the first IPv4 header is stored in the database (S518). Referring to FIG. 4, the AFTR element 415 also stores the IPv4/TCP header information 420 including the IPv4 DSCP value in the ToS field 423 in the database, e.g., NAT database 440.

The first IPv4 packet is forwarded to a destination IPv4 network (S522). Referring to FIG. 4, the AFTR element 415 then transmits the IPv4 packet 420 to the IPv4 internet 416 and IPv4 servers 417.

The responding IPv4 packet is encapsulated with a second IPv6 header to form a second IPv6 packet encapsulating the responding IPv4 packet (S530). Referring to FIG. 4, IPv4 packets 450 are returned from the Internet 416 and processed by the AFTR element 415. Packets 450 returned from the Internet 416 may not contain the original QoS/DSCP bits, i.e., the bits in the IPv4 ToS field 444. In FIG. 4, the IPv4 ToS bits 454 have been cleared.

At least one of the TC value, the Flow Label value, and the ToS value are retrieved from the database (S534). Referring to FIG. 4, the AFTR element 415 retrieves the IPv4 DSCP value 462 in the ToS field 423 that was stored in, for example, the NAT database 440. The AFTR element 415 also obtains the IPv6 header 461, the IPv6 TC value 460, the IPv4 DSCP value 462, and the FL value 463.

Based on the at least one policy, perform at least one of: inserting the retrieved ToS value into the ToS field in the IPv4 header of the responding IPv4 packet and into the IPv6 TC field in the IPv6 header, inserting the retrieved ToS value into the ToS field in the IPv4 header of the responding IPv4 packet and inserting the retrieved TC value into the TC field in the IPv6 header, inserting the retrieved TC value into the TC field in the IPv6 header and into the ToS field in the IPv4 header of the responding IPv4 packet, and inserting the retrieved value of the IPv6 FL field in the IPv6 header in the IPv6 header. (S538). Referring to FIG. 4, the IPv4 DSCP value 462 is inserted into the ToS field 454. The IPv4 DSCP value 462 may be inserted into the IPv6 TC field 455, or the IPv6 TC value 460 obtained from the NAT 440 may be inserted into the IPv6 TC field 455. The FL value 463 is inserted into the FL field 425.

The IPv6 Header Is Used By A Cable Modem Termination System (CMTS) For Classification (S542) Referring to FIG. 4, classifiers at the CMTS 413 may use the IPv6 header 422 to classify packets. For example, classifiers at the CMTS 413 may use the value in the IPv6 FL field 425 pr the value of the IPv6 TC field 424.

The method then ends (S550).

Figure 6:
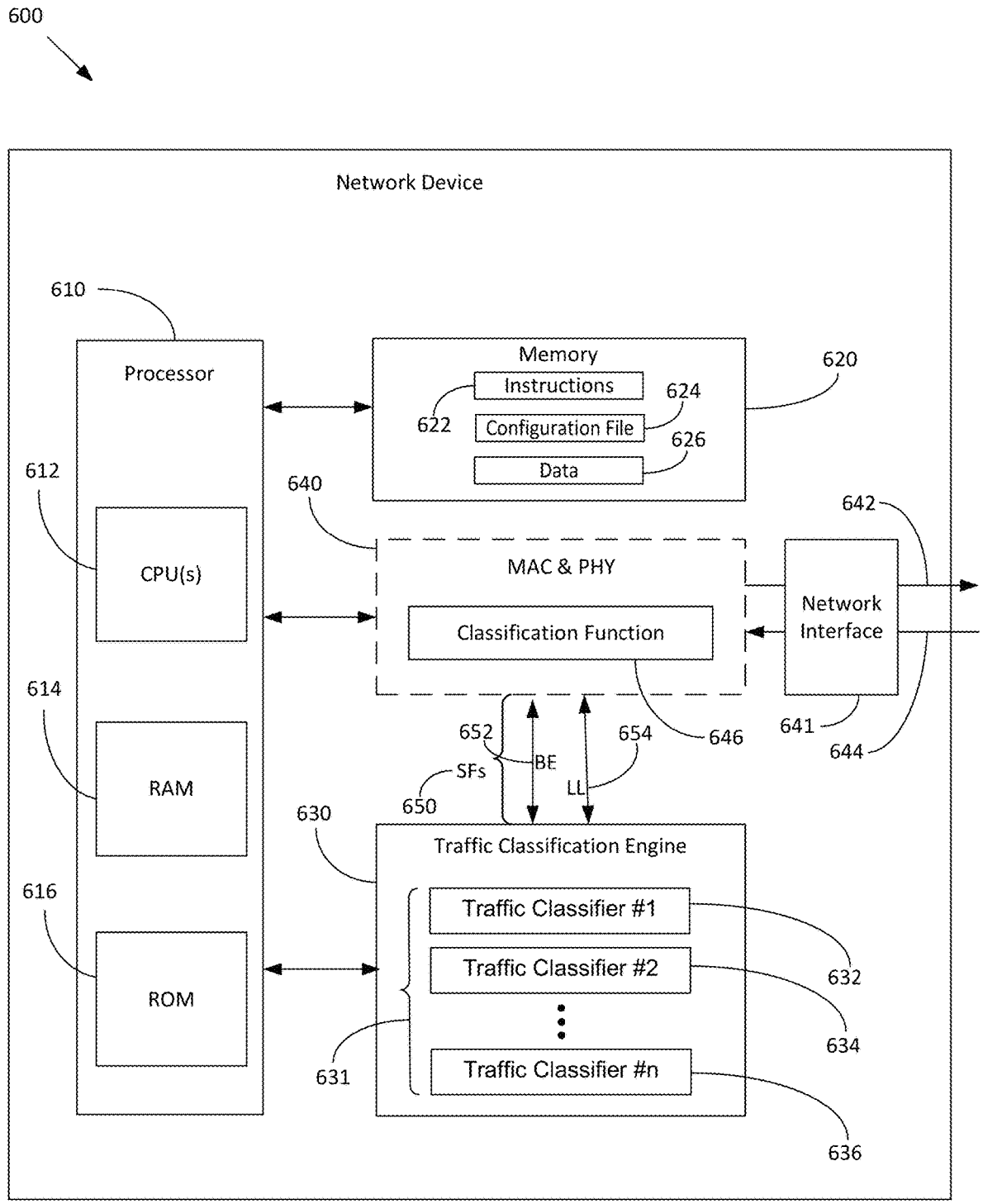
FIG. 6 illustrates a block diagram of a network device.

FIG. 6 illustrates a block diagram of a network device 600.

In FIG. 6, Network Device 600 may be a CM/B4 element, a CMTS, and/or an AFTR element. The Network Device 600 includes a Processor 610 and Memory 620. The Network Device 600 may also include a Traffic Classification Engine 630, and a Media Access Controller (MAC) and Physical Transceiver (PHY) 640. Classification 646 is a function of the MAC/PHY 640. However, an AFTR element does not include a MAC/PHY layer 640. An AFTR element has network interfaces 641, a processor 610, memory 620 including a database 626.

Processor 610 includes CPUs 612, random access memory (RAM) 614, and read-only memory (ROM) 616. Memory 620 may store Instructions 622 and a Configuration File 624. Configuration File 624 may include classification encodings or rules for that Processor 610 uses to implement Traffic Classifiers 632, 634, 636 by Traffic Classification Engine 630.

Service Flows (SFs) and Traffic Classifiers (TCls) in a configuration file identify Quality of Service (QoS) SFs and what traffic flows should be assigned by a TCl to that QoS. Classification Engine 630 include includes one or more traffic classifiers, such as Traffic Classifier #1 632, Traffic Classifier #2 634, and Traffic Classifier #n 636. Traffic classifiers 631, such as Traffic Classifier #1 632, Traffic Classifier #2 634, and Traffic Classifier #n 636, filter packets according to classification or rules, as discussed above, and assigns appropriate packets to Service Flows (SFs) 650. SFs 650 may include, for example, a classic SF 652 for best effort services, and a low latency SF 654 for voice calls.

A processor 610 of the Network Device 600 implements at least one traffic classifier 631, such as Traffic Classifier #1 632, Traffic Classifier #2 634, and Traffic Classifier #n 636, to provide classification for tunneled IPinIP traffic).

The Network Device 600 receives a tunneled IPinIP packet that includes an IPv6 header, an IPv4 header; and a TCP/UDP header. The processor uses the at least one classifier 631 to compare the classification parameters to fields in one of an IPv6 header, an IPv4 header, and a TCP/UDP header of the IPinIP packet. Based on the comparison, the processor 610 maps the IPinIP packet to a service flow identified by the classification parameters.

The MAC layer of MAC/PHY 640 processes packets that are sent and received. As part of each packet, there is a MAC layer data header that has addressing information as well as packet options. The Physical Transceiver of MAC/PHY 640 defines the physical and electrical characteristics of the network. It is responsible for managing the Network Interfaces 641 that modulates and demodulates the RF bits that are sent 642 and received 644.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device, comprising:
   a memory storing computer-readable instructions and at least one policy for preserving Quality of Service (QoS) markings; and
   a processor configured to execute the computer-readable instructions to:
   receive, over an Internet Protocol version 4-in-Internet Protocol version 6 (IPv4-in-IPv6) tunnel of service provider network, a first IPv6 packet encapsulating a first IPv4 packet;
   remove a first IPv6 header from the first IPv6 packet to leave the first IPv4 packet and store an IPv6 record including a first Differentiated Services Code Point (DSCP) value in a Traffic Class (TC) field from the first IPv6 header in a database;
   obtain a first IPv4 header from the first IPv4 packet and store an IPv4 record including a second DSCP value in a Type of Service (ToS) field from the first IPv4 header in the database; and
   forward the first IPv4 packet to a destination IPv4 network;
   receive a responding IPv4 packet having a second IPv4 header;
   encapsulate the responding IPv4 packet with a second IPv6 header to form a second IPv6 packet encapsulating the responding IPv4 packet;
   retrieve the IPv6 record including the first DSCP value and the IPv4 record including the second DSCP value from the database;
   based on the at least one policy, perform one of:
      inserting the retrieved second DSCP value into an IPv4 ToS field in the second IPv4 header of the responding IPv4 packet and into an IPv6 TC field in the second IPv6 header;
      inserting the retrieved second DSCP value into the IPv4 ToS field in the second IPv4 header of the responding IPv4 packet and inserting the retrieved first DSCP value into the IPv6 TC field in the second IPv6 header; and
      inserting the retrieved first DSCP value into the IPv6 TC field in the second IPv6 header and into the IPv4 ToS field in the second IPv4 header of the responding IPv4 packet; and
   forward the second IPv6 packet encapsulating the responding IPv4 packet downstream.

2. The network device of claim 1, wherein the IPv6 packet encapsulating the responding IPv4 packet is classified using the first DSCP value in the second IPv6 header.

3. The network device of claim 1, wherein the first IPv6 header includes a Flow Label field value, the processor is further configured to store the Flow Label field value in the IPv6 record in the database, and retrieve the Flow Label field value from the database and insert the Flow Label field value into the second IPv6 header of the second IPv6 packet encapsulating the responding IPv4 packet, the Flow Label field value of the second IPv6 header used to classify the second IPv6 packet.

4. The network device of claim 1, wherein the processor stores the IPv6 record including the first DSCP value in the TC field in a Network Address Translation (NAT) database.

5. The network device of claim 1, wherein the processor stores the IPv4 record including the second DSCP value in the ToS field in a Network Address Translation (NAT) database.

6. The network device of claim 1, wherein the processor performs one of copying ECN bits from the IPv6 TC field to a corresponding position in the IPv4 ToS field of the first IPv4 packet received at an egress point of an upstream IPv6 tunnel before being forwarded to the destination IPv4 network and copying ECN bits from the IPv4 ToS field to a corresponding position in the IPv6 TC field of a second IPv6 packet before being forwarded to an ingress point of a downstream IPv6 tunnel.

7. A method of preserving Quality of Service (QoS) markings for downstream flows, comprising:
   receiving, over an Internet Protocol version 4-in-Internet Protocol version 6 (IPv4-in-IPv6) tunnel of service provider network, a first IPv6 packet encapsulating a first IPv4 packet;

removing a first IPv6 header from the first IPv6 packet to leave the first IPv4 packet and storing an IPv6 record including a first Differentiated Services Code Point (DSCP) value in a Traffic Class (TC) field from the first IPv6 header in a database;

obtaining a first IPv4 header from the first IPv4 packet and storing an IPv4 record including a second DSCP value in a Type of Service (ToS) field from the first IPv4 header in the database; and forwarding the first IPv4 packet to a destination IPv4 network;

receiving a responding IPv4 packet having a second IPv4 header;

encapsulating the responding IPv4 packet with a second IPv6 header to form a second IPv6 packet encapsulating the responding IPv4 packet;

retrieving the IPv6 record including the first DSCP value and the IPv4 record including the second DSCP value from the database;

based on at least one policy, performing one of:
    inserting the retrieved second DSCP value into an IPv4 ToS field in the second IPv4 header of the responding IPv4 packet and into an IPv6 TC field in the second IPv6 header;
    inserting the retrieved second DSCP value into the IPv4 ToS field in the second IPv4 header of the responding IPv4 packet and inserting the retrieved first DSCP value into the IPv6 TC field in the second IPv6 header; and
    inserting the retrieved first DSCP value into the IPv6 TC field in the second IPv6 header and into the IPv4 ToS field in the second IPv4 header of the responding IPv4 packet; and forwarding the second IPv6 packet encapsulating the responding IPv4 packet downstream.

8. The method of claim 7, further comprising using the first DSCP value in the second IPv6 header to classify the IPv6 packet encapsulating the responding IPv4 packet.

9. The method of claim 8, wherein the storing the IPv6 record including the first DSCP value in the TC field from the first IPv6 header in a database further comprises storing a Flow Label field value from the first IPv6 header in the database, the method further comprising retrieving the Flow Label field value from the database, inserting the Flow Label field value into the second IPv6 header of the second IPv6 packet encapsulating the responding IPv4 packet, and using the Flow Label field value of the second IPv6 header to classify the second IPv6 packet.

10. The method of claim 7, wherein the storing the IPv6 record including the first DSCP value in a database further comprises storing the IPv6 record including the first DSCP value in Network Address Translation (NAT) database.

11. The method of claim 7, wherein the storing the IPv4 record including the second DSCP value in a database further comprises storing the IPv4 record including the second DSCP value in a Network Address Translation (NAT) database.

12. The method of claim 7 further comprising performing one of copying ECN bits from the IPv6 TC field to a corresponding position in the IPv4 ToS field of the first IPv4 packet received at an egress point of an upstream IPv6 tunnel before being forwarded to the destination IPv4 network and copying ECN bits from the IPv4 ToS field to a corresponding position in the IPv6 TC field of a second IPv6 packet before being forwarded to an ingress point of a downstream IPv6 tunnel.

13. A non-transitory computer-readable media having computer-readable instructions stored thereon, which when executed by a processor causes the processor to perform operations comprising:

receiving, over an Internet Protocol version 4-in-Internet Protocol version 6 (IPv4-in-IPv6) tunnel of service provider network, a first IPv6 packet encapsulating a first IPv4 packet;

removing a first IPv6 header from the first IPv6 packet to leave the first IPv4 packet and storing an IPv6 record including a first Differentiated Services Code Point (DSCP) value in a Traffic Class (TC) field from the first IPv6 header in a database;

obtaining a first IPv4 header from the first IPv4 packet and storing an IPv4 record including a second DSCP value in a Type of Service (ToS) field from the first IPv4 header in the database; and forwarding the first IPv4 packet to a destination IPv4 network;

receiving a responding IPv4 packet having a second IPv4 header;

encapsulating the responding IPv4 packet with a second IPv6 header to form a second IPv6 packet encapsulating the responding IPv4 packet;

retrieving the IPv6 record including the first DSCP value and the IPv4 record including the second DSCP value from the database; and based on at least one policy, performing one of:
    inserting the retrieved second DSCP value into an IPv4 ToS field in the second IPv4 header of the responding IPv4 packet and into an IPv6 TC field in the second IPv6 header;
    inserting the retrieved second DSCP value into the IPv4 ToS field in the second IPv4 header of the responding IPv4 packet and inserting the retrieved first DSCP value into the IPv6 TC field in the second IPv6 header; and
    inserting the retrieved first DSCP value into the IPv6 TC field in the second IPv6 header and into the IPv4 ToS field in the second IPv4 header of the responding IPv4 packet; and forward the second IPv6 packet encapsulating the responding IPv4 packet downstream.

14. The non-transitory computer-readable media of claim 13, further comprising using the first DSCP value in the second IPv6 header to classify the IPv6 packet encapsulating the responding IPv4 packet.

15. The non-transitory computer-readable media of claim 13, wherein the storing the IPv6 record including the first DSCP value in the TC field from the first IPv6 header in a database further comprises storing a Flow Label field value from the first IPv6 header in the database, the method further comprising retrieving the Flow Label field value from the database, inserting the Flow Label field value into the second IPv6 header of the second IPv6 packet encapsulating the responding IPv4 packet, and using the Flow Label field value of the second IPv6 header to classify the second IPv6 packet.

16. The non-transitory computer-readable media of claim 13, wherein the storing the IPv6 record including the first DSCP value in the TC field in a database further comprises storing the IPv6 record including the first DSCP value in the TC field in Network Address Translation (NAT) database, and wherein the storing the IPv4 record including the second DSCP value in the ToS field in a database further comprises storing the IPv4 record including the second DSCP value in the ToS field in a Network Address Translation (NAT) database.

17. The non-transitory computer-readable media of claim 13 further comprising performing one of copying ECN bits from the IPv6 TC field to a corresponding position in the IPv4 ToS field of the first IPv4 packet received at an egress point of an upstream IPv6 tunnel before being forwarded to the destination IPv4 network and copying ECN bits from the IPv4 ToS field to a corresponding position in the IPv6 TC field of a second IPv6 packet before being forwarded to an ingress point of a downstream IPv6 tunnel.

* * * * *